United States Patent
Citron et al.

(10) Patent No.: US 8,181,068 B2
(45) Date of Patent: May 15, 2012

(54) APPARATUS FOR AND METHOD OF LIFE-TIME TEST COVERAGE FOR EXECUTABLE CODE

(75) Inventors: Daniel Citron, Haifa (IL); Itzhack Goldberg, Hadera (IL); Moshe Klausner, Ramat Yishay (IL); Marcel Zalmanovici, Kiriat Motzkin (IL)

(73) Assignee: International Business Machines Corporation, Armonk, NY (US)

( * ) Notice: Subject to any disclaimer, the term of this patent is extended or adjusted under 35 U.S.C. 154(b) by 397 days.

(21) Appl. No.: 12/055,339

(22) Filed: Mar. 26, 2008

(65) Prior Publication Data

US 2009/0249044 A1 Oct. 1, 2009

(51) Int. Cl.
*G06F 11/00* (2006.01)

(52) U.S. Cl. ............... 714/38.1; 714/38.13; 714/799

(58) Field of Classification Search ............ 714/38, 714/38.1, 38.13, 799
See application file for complete search history.

(56) References Cited

U.S. PATENT DOCUMENTS

| 2005/0210452 | A1 | 9/2005 | Dimpsey | |
|---|---|---|---|---|
| 2006/0101419 | A1 | 5/2006 | Babcock | |
| 2006/0195724 | A1* | 8/2006 | Filho | 714/35 |
| 2006/0231656 | A1* | 10/2006 | Lee | 241/282.2 |
| 2006/0277439 | A1* | 12/2006 | Davia et al. | 714/38 |
| 2008/0172580 | A1* | 7/2008 | Davia et al. | 714/38 |
| 2009/0037886 | A1* | 2/2009 | McCoy et al. | 717/128 |

* cited by examiner

*Primary Examiner* — Scott Baderman
*Assistant Examiner* — Sarai Butler
(74) *Attorney, Agent, or Firm* — Howie Zaretsky

(57) ABSTRACT

A novel and useful apparatus for and method of associating a dedicated coverage bit to each instruction in a software system. Coverage bits are set every time the software application runs, enabling a more comprehensive and on-going code coverage analysis. The code coverage bit mechanism enables code coverage analysis for all installations of a software application, not just software in development mode or at a specific installation. Code coverage bits are implemented in either the instruction set architecture (ISA) of the central processing unit, the executable file of a software application, a companion file to the executable file or a code coverage table residing in memory of the computer system.

20 Claims, 8 Drawing Sheets

APPARATUS FOR AND METHOD OF LIFE-TIME TEST COVERAGE FOR EXECUTABLE CODE

REFERENCE TO RELATED APPLICATION

The present invention is related to U.S. application Ser. No. 10/807,094, filed Mar. 22, 2004, entitled "Method And Apparatus For Providing Hardware Assistance For Code," incorporated herein by reference in its entirety.

FIELD OF THE INVENTION

The present invention relates to the field of software testing and more particularly relates to a mechanism for providing lifetime code coverage without impacting system performance

BACKGROUND OF THE INVENTION

Test coverage of software is generally measured during the development phase. Test coverage tracks a program's execution and identifies which instructions are executing. This enables developer to optimize code by removing portions of code that never execute. An example of code that never executes is an error handler for a situation which never occurs. The inherent disadvantage to this approach is that code coverage is measured in the development and testing phases, and generally ends once the code goes into production.

In order to test coverage in production software shipped to customers, software is instrumented. Instrumentation adds extra code to the software and traps to the instrumentation code whenever uncovered code (i.e. code not previously accessed) is executed. Implementing instrumentation requires extra development and execution time. In addition, executing software with instrumentation adds additional overhead and exposes the software to additional defects. All existing coverage techniques implementing instrumentation involve some kind of software traps (e.g., breakpoints).

Therefore, there is a need for a code coverage detection mechanism that does not increase overhead or impact performance. The mechanism should provide code coverage analysis at all stages of the development and production cycles. By continually analyzing code coverage at all system installations more comprehensive code coverage can be realized.

SUMMARY OF THE INVENTION

The present invention provides a solution to the prior art problems discussed above by associating a dedicated coverage bit to each instruction in a software system. Coverage bits are set every time the software application executes, enabling a more comprehensive and on-going code coverage analysis. The code coverage bit mechanism of the present invention enables code coverage analysis for all installations of a software application, not just software in development mode or at a specific installation.

In one embodiment of the present invention, the coverage bit is implemented as a dedicated bit added to the instruction set architecture (ISA) of the central processing unit (CPU).

In another embodiment of the present invention, the coverage bit is stored in a code coverage section incorporated in the software application's executable file, or a companion file to the executable file. In still yet another embodiment of the present invention, the coverage bit is maintained in a code coverage table residing in memory of the computer system during program execution. Upon program termination the code coverage table is saved to disk (i.e. permanent storage).

The invention is operative to facilitate the design of central processing units that incorporate hardware support for code coverage bits, either as part of the CPU's ISA or via a code coverage table. A CPU implementing the lifetime code coverage mechanism of the present invention will enable executable code to be continually monitored, without impacting performance.

Note that some aspects of the invention described herein may be constructed as software objects that are executed in embedded devices as firmware, software objects that are executed as part of a software application on either an embedded or non-embedded computer system such as a digital signal processor (DSP), microcomputer, minicomputer, microprocessor, etc. running a real-time operating system such as WinCE, Symbian, OSE, Embedded LINUX, etc. or non-real time operating system such as Windows, UNIX, LINUX, etc., or as soft core realized HDL circuits embodied in an Application Specific Integrated Circuit (ASIC) or Field Programmable Gate Array (FPGA), or as functionally equivalent discrete hardware components.

There is thus provided in accordance with the invention, a method of implementing test coverage for a software instruction executing on a computer system and loaded from a software image, the method comprising the steps of setting a code coverage bit associated with the executing instruction and storing the set code coverage bit on said computer system.

There is also provided in accordance with the invention, a method of implementing test coverage via a code coverage table for a software instruction executing on a computer system, where the executing instruction is one of a plurality of software instruction loaded from a software image, the method comprising the steps of determining a coverage table associated with said software image, identifying a code coverage bit within the code coverage table associated with the executing instruction and setting the identified code coverage bit.

There is further provided in accordance with the invention, a computer system implementing a code coverage table comprising a central processing unit comprising a coverage table register, a plurality of memory cells coupled to the central processing unit and means for realizing a code coverage table in the plurality of memory cells.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

Figure 1:
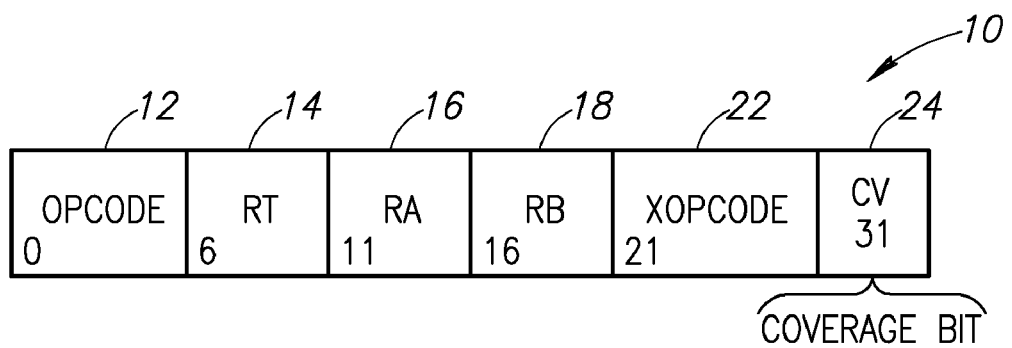
FIG. 1 is a diagram of a first example computer executable instruction illustrating the instruction set architecture coverage bit mechanism of the present invention.

The following notation is used throughout this document:

| Term | Definition |
|---|---|
| CAM | Content Addressable Memory |
| CC | Coverage Cache |
| CPU | Central Processing Unit |
| CT | Coverage Table |
| CWB | Coverage Write Buffer |
| DSP | Digital Signal Processor |
| FIFO | First In First Out |
| FPGA | Field Programmable Gate Array |
| HDL | Hardware Description Language |
| ID | Identifier |
| ISA | Instruction Set Architecture |
| LRU | Least Recently Used |
| MSB | Most Significant Bit |
| NOP | No Operation |
| OS | Operating System |
| PC | Program Counter |
| TID | Thread Identifier |
| TLB | Transaction Lookaside Buffer |

DETAILED DESCRIPTION OF THE INVENTION

The present invention provides a solution to the prior art problems discussed hereinabove by associating a dedicated coverage bit to each instruction in a software system. Coverage bits are set every time the software application executes, enabling a more comprehensive and on-going code coverage analysis. The code coverage bit mechanism of the present invention enables code coverage analysis for all installations of a software application, not just software in development mode or at a specific installation.

In one embodiment of the present invention, the coverage bit is implemented as a dedicated bit added to the instruction set architecture (ISA) of the central processing unit (CPU). In another embodiment of the present invention, the coverage bit is stored in a code coverage table incorporated in the software application's executable file, or a companion file to the executable file. In still yet another embodiment of the present invention, the coverage bit is maintained in a code coverage table residing in memory of the computer system during program execution. Upon program termination the code coverage table is saved to disk (i.e. permanent storage).

The invention is operative to facilitate the design of central processing units that incorporate hardware support for code coverage bits, either as part of the CPU's ISA or via a code coverage table. A CPU implementing the lifetime code coverage mechanism of the present invention will enable executable code to be continually monitored, without impacting performance.

Instruction Set Architecture Code Coverage Mechanism

In accordance with the invention, a first embodiment of the code coverage mechanism of the present invention adds a dedicated coverage bit to each instruction of the central processing unit's (CPU) Instruction Set Architecture (ISA). When a program is compiled, the compiler generates all instructions with the coverage bit cleared. During program execution this bit will be set for every instruction executed. After each instruction is executed, the modified code (i.e. code incorporating the coverage bit) is written back to the executing image. The ISA code coverage mechanism enables code coverage to be quickly determined by reading the executable file after every execution.

Several advantages of the ISA code coverage mechanism where there is a dedicated code coverage bit for each instruction include: (1) no extra instrumentation code is inserted during the development stage; (2) no traps, illegal opcodes, or extra NOPs are required for instrumentation; and (3) since the ISA (i.e. run-time code) coverage mechanism cannot alter the execution of the program, there are no side effects.

A first example of the ISA code coverage mechanism of the present invention is shown in FIG. 1. The 32 bit instruction, generally referenced 10, comprises six bit opcode 12, five bit registers 14, 16, 18, ten bit extended opcode (xopcode) 20 and coverage bit 22.

Figure 2:
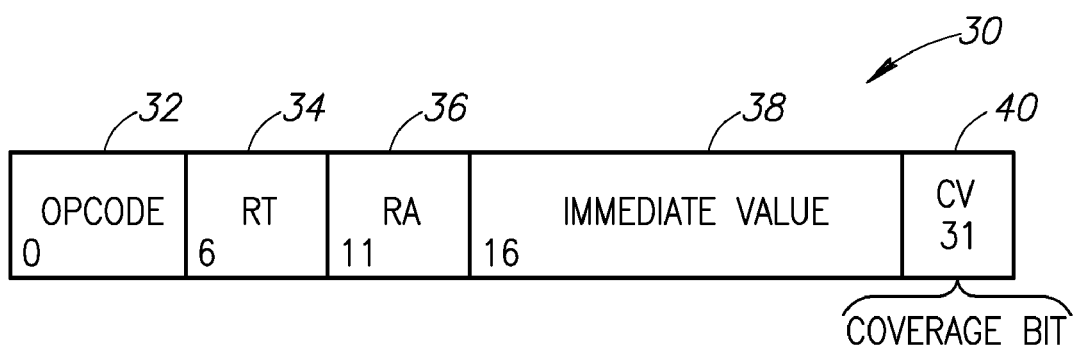
FIG. 2 is a diagram of a second example computer executable instruction illustrating the instruction set architecture coverage bit mechanism of the present invention.

A second example of the ISA code coverage mechanism of the present invention is shown in FIG. 2. The 32 bit instruction, generally referenced 30, comprises six bit opcode 32, five bit registers 34, 36, fifteen bit immediate value 38 and coverage bit 40. Instruction 30 stores an immediate value in lieu of the xopcode stored in instruction 10. A key feature of this implementation is that the CPU updates the same coverage bit (i.e. location) for each instruction.

Figure 3:
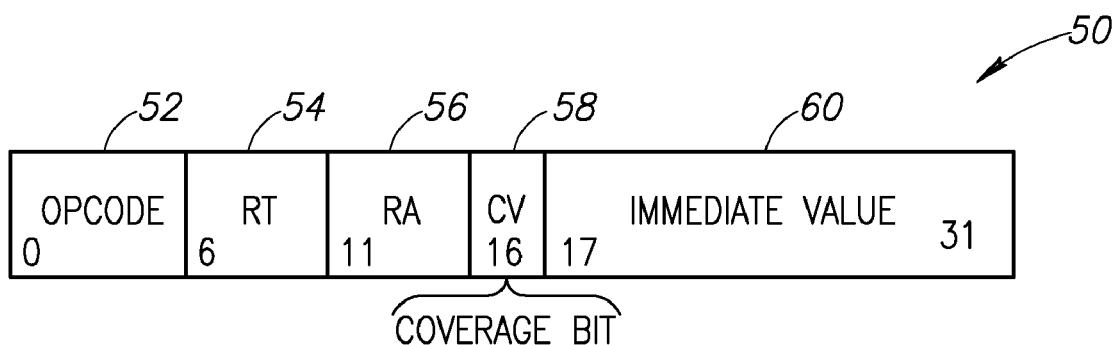
FIG. 3 is a diagram of a third example computer executable instruction illustrating the instruction set architecture coverage bit mechanism of the present invention.

A third example of the ISA code coverage mechanism of the present invention is shown in FIG. 3. The 32 bit instruction, generally referenced 50, comprises six bit opcode 52, five bit registers 54, 56, coverage bit 58 and fifteen bit immediate value 60. This implementation illustrates that the code coverage bit can be implemented in different positions within the instruction.

To implement the ISA code coverage mechanism of the present invention, the instruction cache of the CPU must be writable in order to contain the updated instructions and the memory pages containing the executable code must have write permissions as well. The executable file must be writable in order to store the updated code coverage bits associated with each instruction. In instances where a program does not terminate (e.g., operating systems, server applications) a mechanism is implemented to collect the updated instructions (i.e. with coverage bit) from memory. The mechanism to write to both memory pages and executable code is generally implemented in either the operating system or system runtime libraries.

Figure 4:
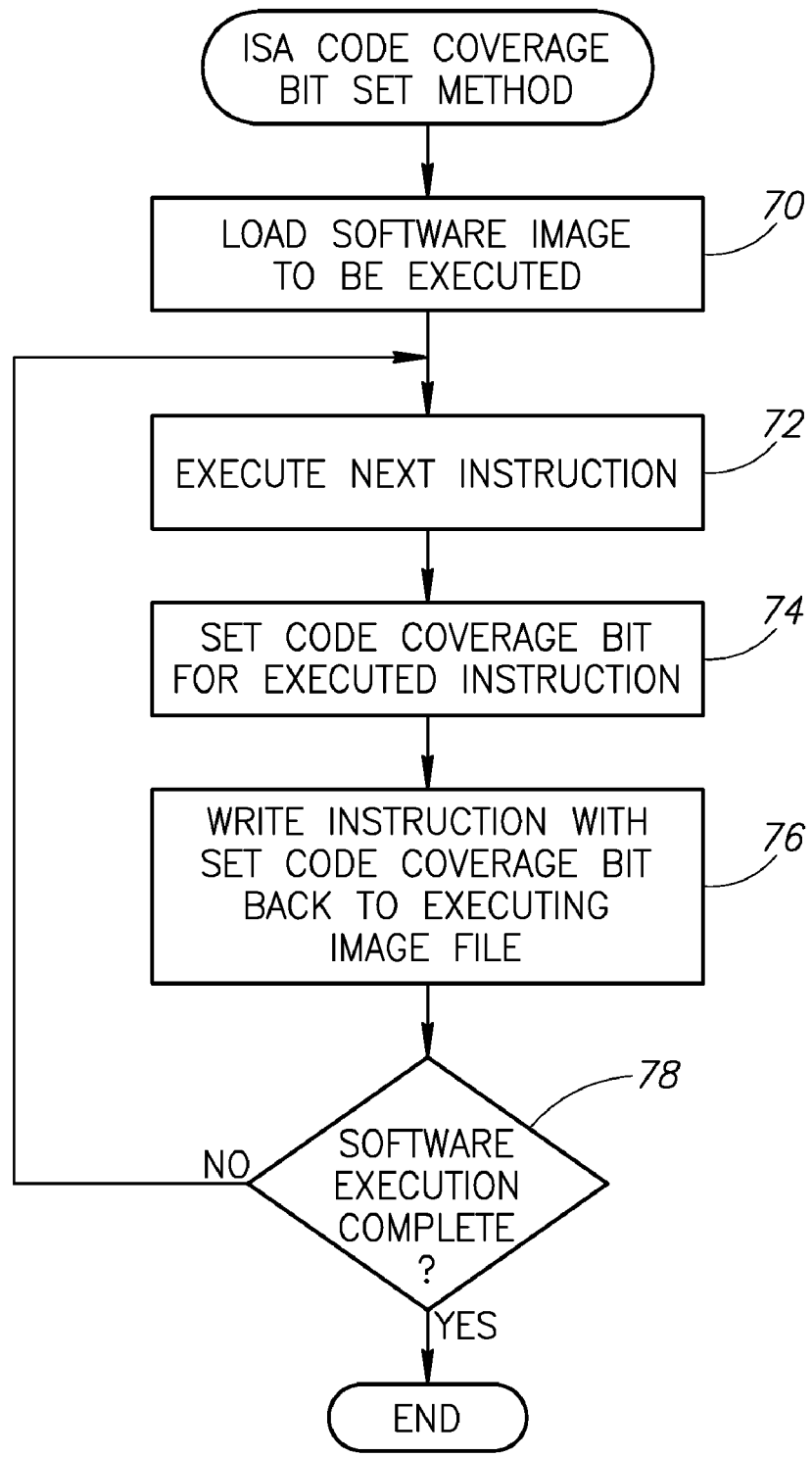
FIG. 4 is a flow diagram illustrating the instruction set architecture coverage bit set method of the present invention.

A flow diagram illustrating the ISA code coverage bit set method of the present invention is shown in FIG. 4. First the software image to be executed is loaded (step 70). The next (or first, if the program just loaded) instruction is executed (step 72). The code coverage bit is set for the executed instruction (step 74) and the instruction with the updated code coverage bit is written back to the executable file (step 76). If there are additional instructions to execute (step 78) then the ISA code coverage bit set method of the present invention returns to step 72. Otherwise, if there are no more instruction to be executed (step 78) then the ISA code coverage bit set method is finished.

Code Coverage Executable Code Section Mechanism

In accordance with the invention, an alternative embodiment of the code coverage mechanism of the present invention implements a mechanism for storing code coverage bits in a section of the executable code which tracks the instructions executed by the software application running on the computer system. The code coverage bit section is implemented in either a dedicated part of the executable file or in a shadow file (i.e. of the executable file).

The coverage bits are kept in a dedicated part of the executable file or in a shadow file (i.e. of the executable file). Each instruction cache line has one coverage bit per instruction. As instructions are executed the code coverage bit associated with the instruction is set.

Figure 5:
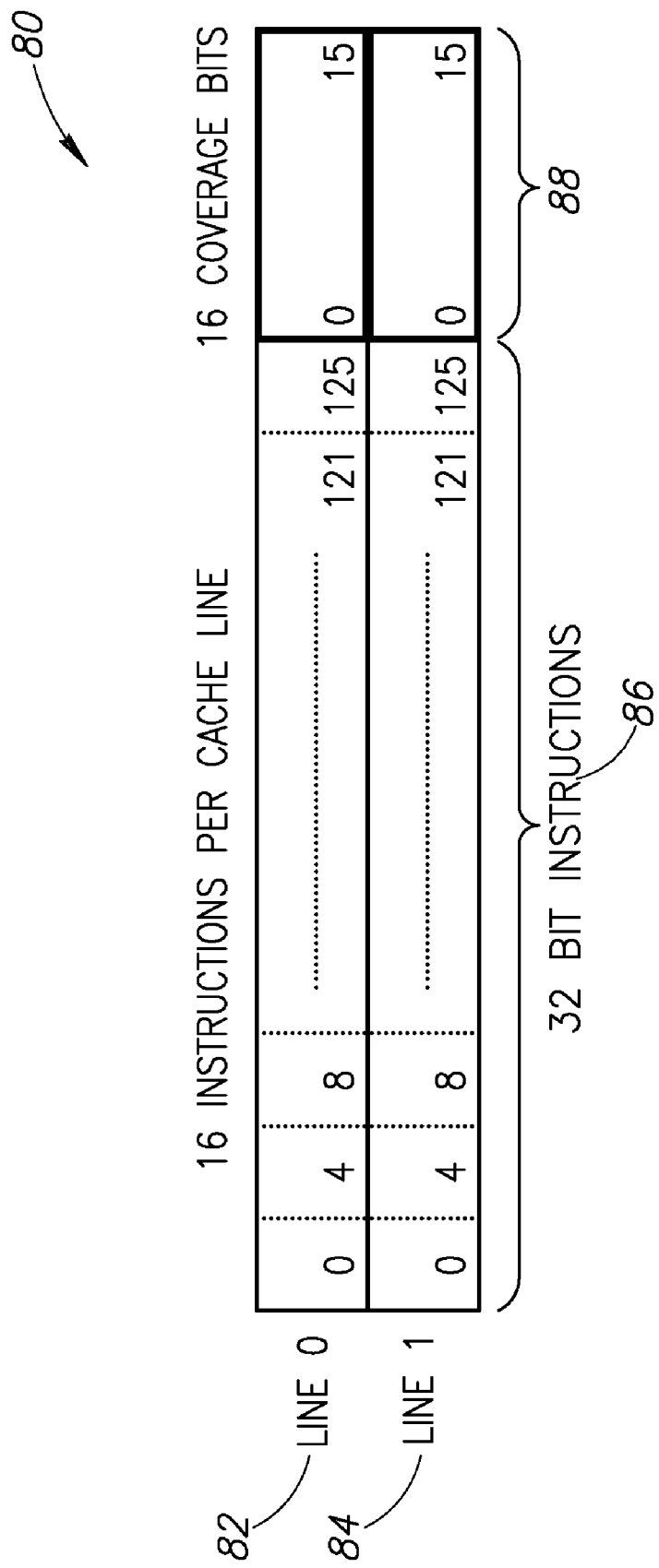
FIG. 5 is a diagram of an example of an instruction cache supporting the code coverage executable code section mechanism of the present invention.

An example of an instruction cache supporting the code coverage executable code section mechanism of the present invention is shown in FIG. 5. The instruction cache, generally referenced 80, comprises cache lines 82, 84. Cache line 82, 84 are further comprised of sixteen 32 bit instructions 86 and sixteen code coverage bits 88. Therefore, each instruction cache line will have a coverage bit per instruction.

When an instruction is executed (i.e. not fetched to the cache, or fetched to the cache but discarded before it is executed), its associated coverage bit is set. When a line is replaced in the cache its coverage bits are written to memory and when the program terminates they are written to the coverage sections of the executable file.

The code coverage executable code section mechanism of the present invention enables tracking back the source of a given coverage by aggregating all the code coverage bit-maps along some metadata (which points at the specific invocation that is responsible for a particular coverage). When a program executes, the code coverage bits that are set in this execution (i.e. and not in prior executions) are appended at the end of the file along with a date and other identifying data (e.g., machine name, input files). The collected coverage code bit maps are then stored either as part of the executable itself (i.e. appended) or in separate file(s).

Figure 6:
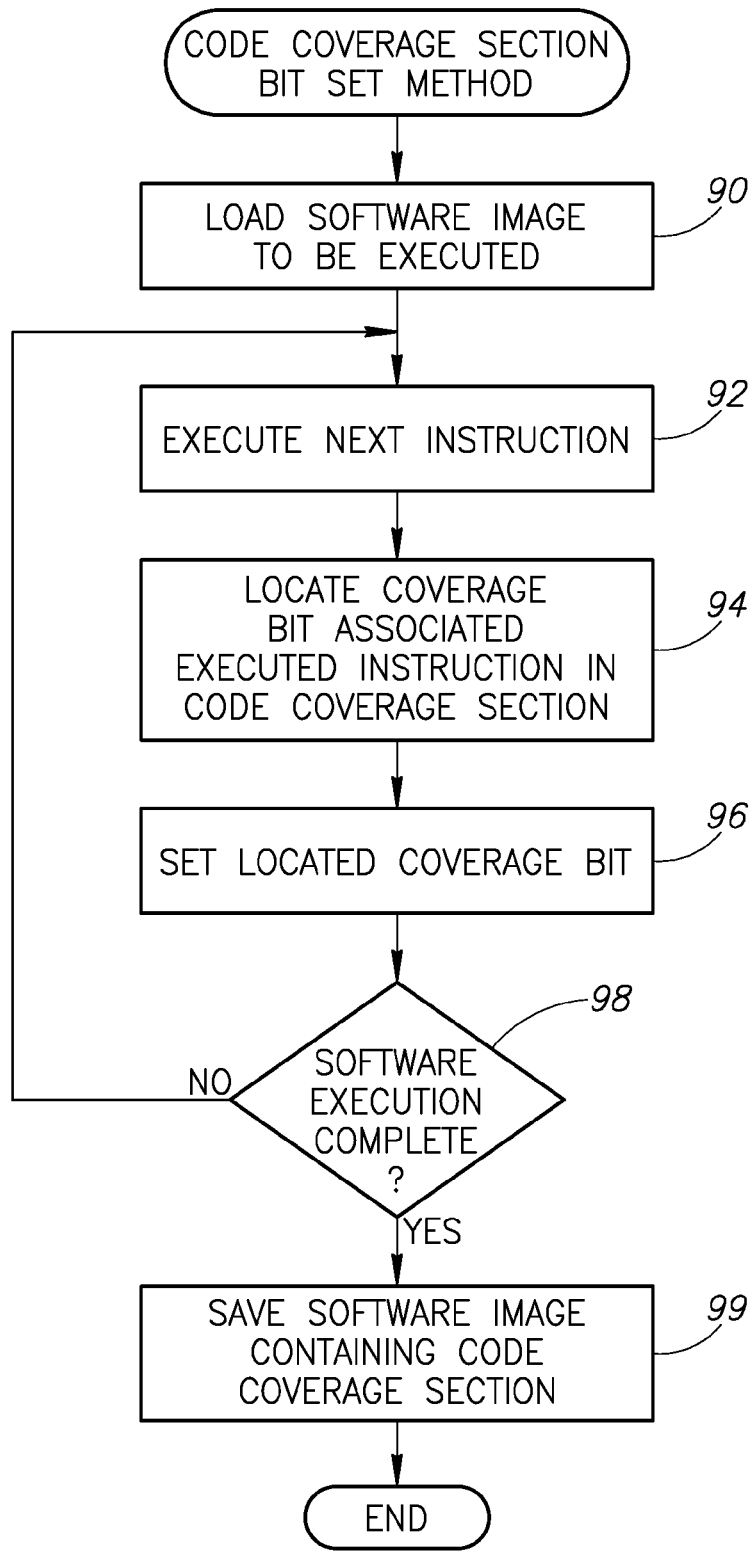
FIG. 6 is a flow diagram illustrating the code coverage section bit set method of the present invention.

A flow diagram illustrating the code coverage section bit set method of the present invention is shown in FIG. 6. First the software image to be executed is loaded (step 90). The next (or first, if the program just loaded) instruction is then executed (step 92). The code coverage bit associated with the executed instruction is located in the code coverage section (step 94) and the located code coverage bit is set (step 96). If there are additional instructions to execute (step 98) then the code coverage section bit set method returns to step 72. Otherwise, if there are no more instructions to be executed (step 98) then the software image (or associated file)_ containing the coverage bits is saved (step 99) and the code coverage section bit set method terminates.

Code Coverage Table Mechanism

In accordance with the invention, still yet another embodiment of the code coverage mechanism of the present invention implements a code coverage table which is constructed by the operating system (OS) in memory when a program is loaded. The table comprises one bit for every instruction in the program and the address of the table is kept in a central processing unit register (similar to the page table register). For example, in a system implementing 32 bit instructions, a code coverage table for a one megabyte executable would be 32 kilobytes (i.e. 1/32 the size of the one megabyte executable).

Figure 7:
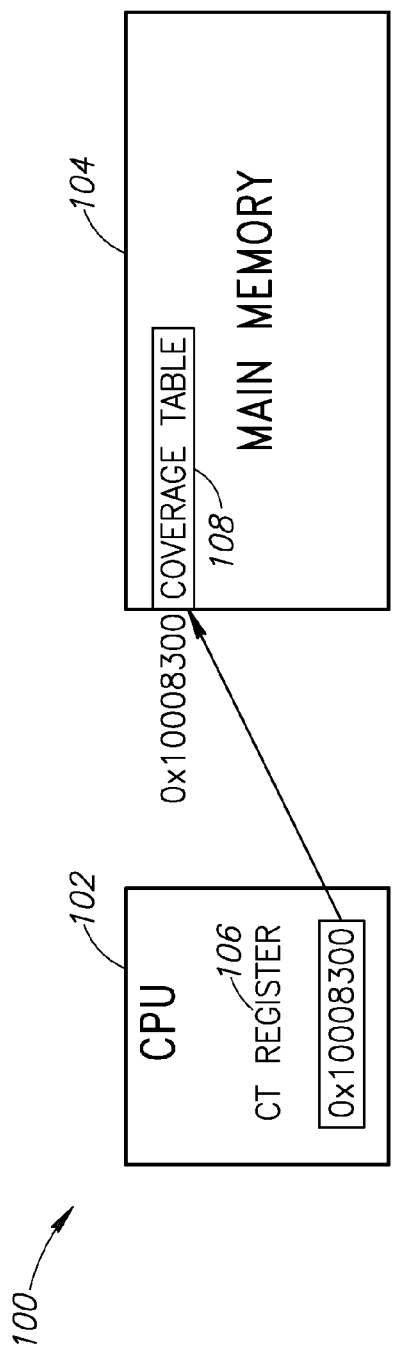
FIG. 7 is a diagram illustrating an example implementation of the code coverage table mechanism of the present invention.

An example implementation of the code coverage table mechanism of the present invention is shown in FIG. 7. The computer system, generally referenced 100, comprises central processing unit 102 and main memory 104. Coverage table (CT) register 106 is implemented in CPU 102 and stores the memory address (in this case 0x1008300) of code coverage table 108.

Performance of a system implementing a coverage code table is enhanced by the implementation of a coverage cache. A coverage cache is a hardware construct that caches part of the coverage table and contains recently accessed instruction addresses. It is analogous to the transaction lookaside buffer (TLB) that caches page table entries The coverage cache should be fully or highly associative and can be implemented utilizing content addressable memory (CAM) which is relatively slow (i.e. compared to cache memory) where fast lookup isn't critical.

In the instruction pipeline of the central processing unit, the coverage bit is set during the commit stage. In most central processing units, the address of the last instruction committed is preserved to ensure correct execution if a trap or context switch occurs. Based on this address and the current program counter (PC), the coverage cache is accessed.

Figure 8:
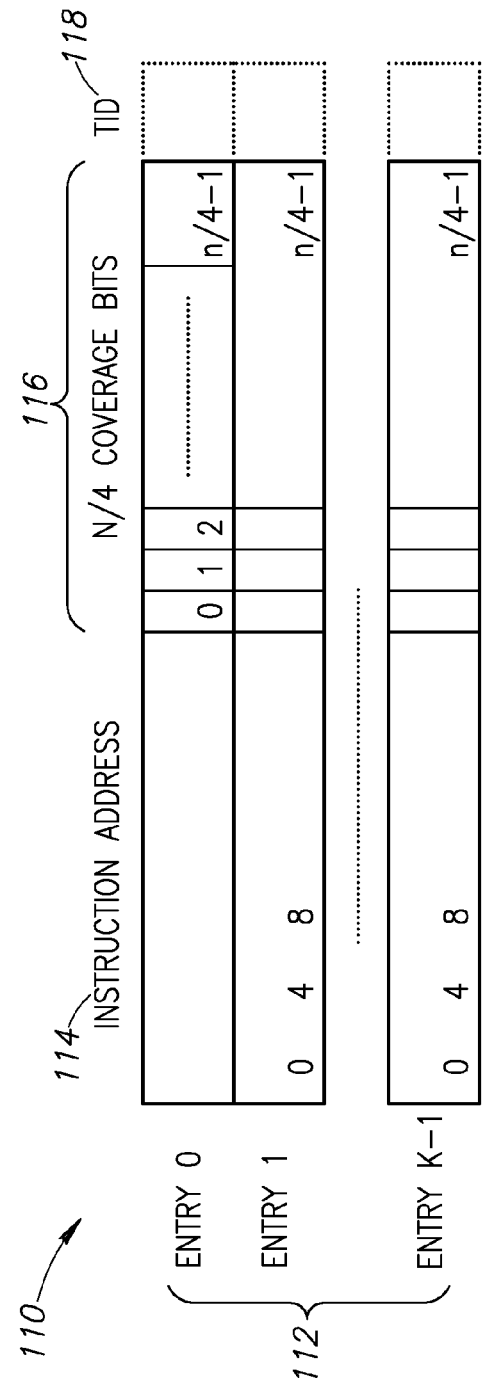
FIG. 8 is a diagram of an example coverage cache supporting the code coverage table mechanism of the present invention.

An example of a coverage cache supporting the code coverage table mechanism of the present invention is shown in FIG. 8. The coverage cache, generally referenced 110, comprises plurality of cache entries 112. Each cache entry is further comprised of instruction address tag 114, coverage bits 116 and thread identifier (TID) 118.

In this implementation, the TID identifies the thread in a simultaneously multithreaded (SMT) central processing unit associated with the instruction in the code coverage table entry.

Instruction address tag 114 comprises the 64-$\log_2$(N) most significant bits (MSB) of the instruction address (where 64-bit addressing is used). Coverage bits 116 comprise N/size of (instruction) coverage bits per address. If the instruction set architecture supports variable size instructions (e.g., Intel x86), the hardware coverage will have to be on a byte basis (i.e. N/1 bits per address in coverage cache 111).

Performance of a system implementing a coverage code table is also enhanced by the implementation of a coverage write buffer (CWB). A coverage write buffer is software accessible (i.e. through a special register) buffer of a plurality of entries. Entries that are evicted from the coverage cache are stored in the coverage write buffer. When the coverage write buffer is full, an interrupt is generated and contents of the coverage write buffer are then written to the coverage table before program execution can resume. The coverage write buffer can be accessed periodically by a helper thread in order to avoid interrupts.

Figure 9:
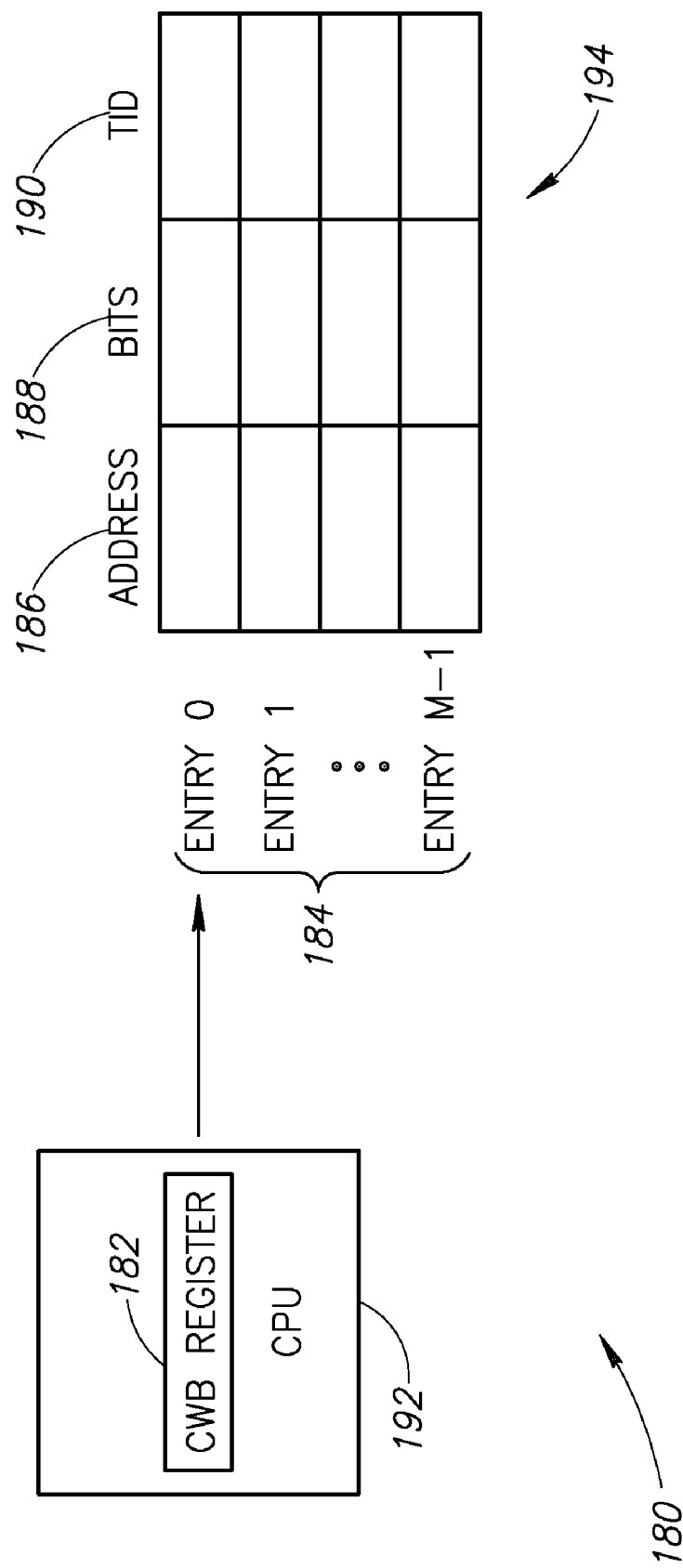
FIG. 9 is a diagram an example of a coverage write buffer supporting the code coverage table mechanism of the present invention.

An example of a coverage write buffer supporting the code coverage table mechanism of the present invention is shown in FIG. 9. The computer system, generally referenced 180, comprises CPU 192 with coverage write buffer register 182 point to coverage write buffer 194. Coverage write buffer 194 further comprises plurality of entries 184, with each entry further comprising address tag 186, coverage (i.e. bit) data 188 and (in this implementation) thread id (i.e. SMT) 190.

Figure 10:
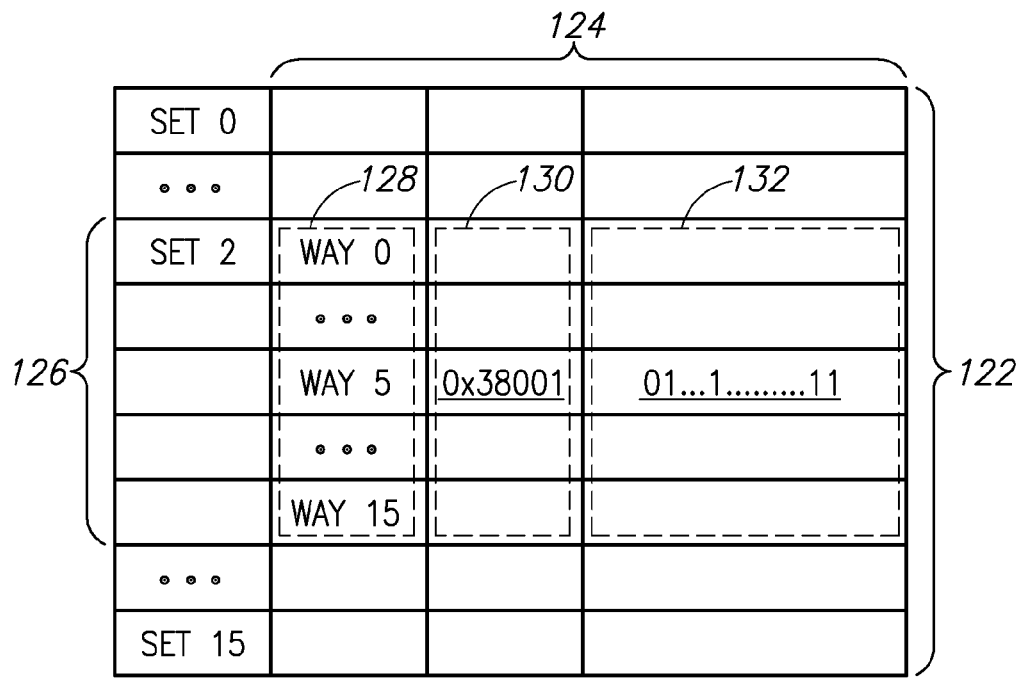
FIG. 10 is a diagram illustrating a example of a coverage cache hit supporting the code coverage table mechanism of the present invention.

An example of a coverage cache hit is shown in FIG. 10. The 256 entry coverage cache (with 32 bit instructions), generally referenced 120, comprises sets 122 (0-15), with each set comprising 16 way sets 124. In this illustration, set 126 (in this case set 2) is expanded to show further detail. Set 126 further comprises ways 128, .address tags 130 and coverage data 132. Each address tag 130 further comprises the 32-$\log_2$(256*16)=20 MSBs of an address. Each coverage data element 132 further comprises 64 bits, one for each four byte instruction in the 256-byte block.

In this coverage cache hit example, instruction add r1, r2, r3 at address 0x38001248 was committed. The low 8 bits of the address (block size) are stripped from the address as follows:

0x38001248→0x380012

The low 4 bits (0x380012) are used to access set 126 and the value 0x38001 is compared to all tags in the set. Way 5 is a match and data bit 0x48/4=18 is set.

Figure 11:
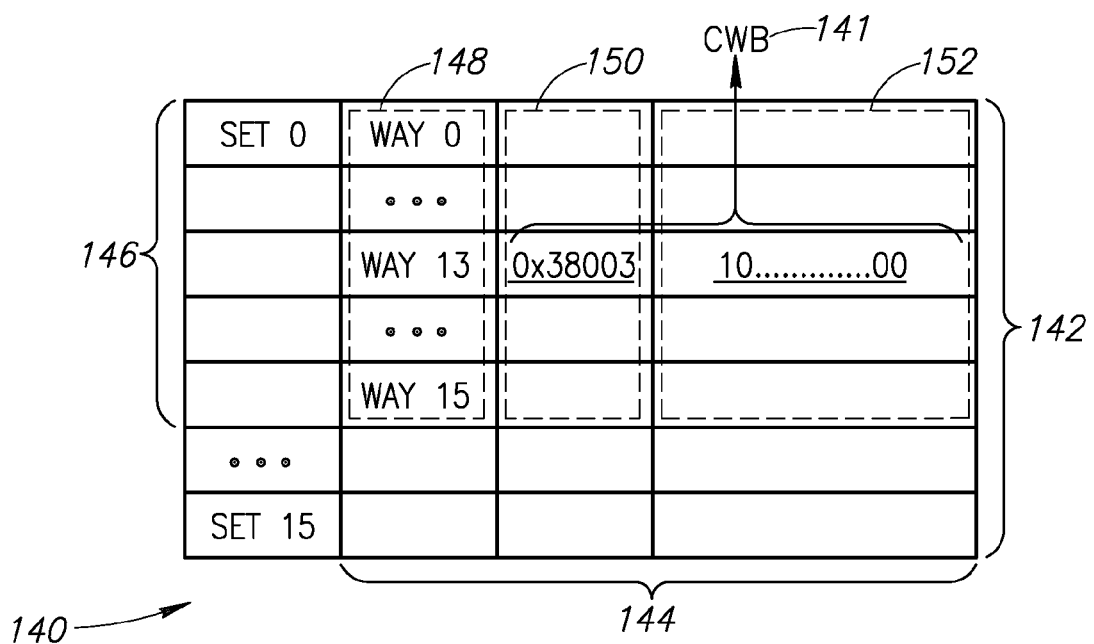
FIG. 11 is a diagram illustrating a example of a coverage cache hit supporting the code coverage table mechanism of the present invention.

An example of a coverage cache miss is shown in FIG. 11. The 256 entry coverage cache (with 32 bit instructions), generally referenced 140, comprises coverage write buffer (CWB) 141, sets 142 (0-15), with each set comprising 16 way sets 144. In this illustration, set 146 (in this case set 0) is expanded to show further detail. Set 146 further comprises ways 148, .address tags 150 and coverage data 152. Each address tag 150 further comprises the 32-$\log_2$(256*16)=20 MSBs of an address. Each coverage data element 152 further comprises 64 bits, one for each four-byte instruction in the 256-byte block.

In this coverage cache hit example, instruction add r1, r2, r3 at address 0x38003000 was committed. The low 8 bits of the address (block size) are stripped from the address as follows:

0x38003000→0x380030

The low 4 bits (0x380030) are used to access set 126 and the value 0x38003 is compared to all tags in the set.

In this example, no match is found. Way 13 is to be evicted (based on LRU, FIFO, or any other scheme) and way 13 is therefore written to CWB 141. Way 13 is subsequently overwritten with the new entry and bit 0x00/4 is set since it is the executed instruction.

Figure 12:
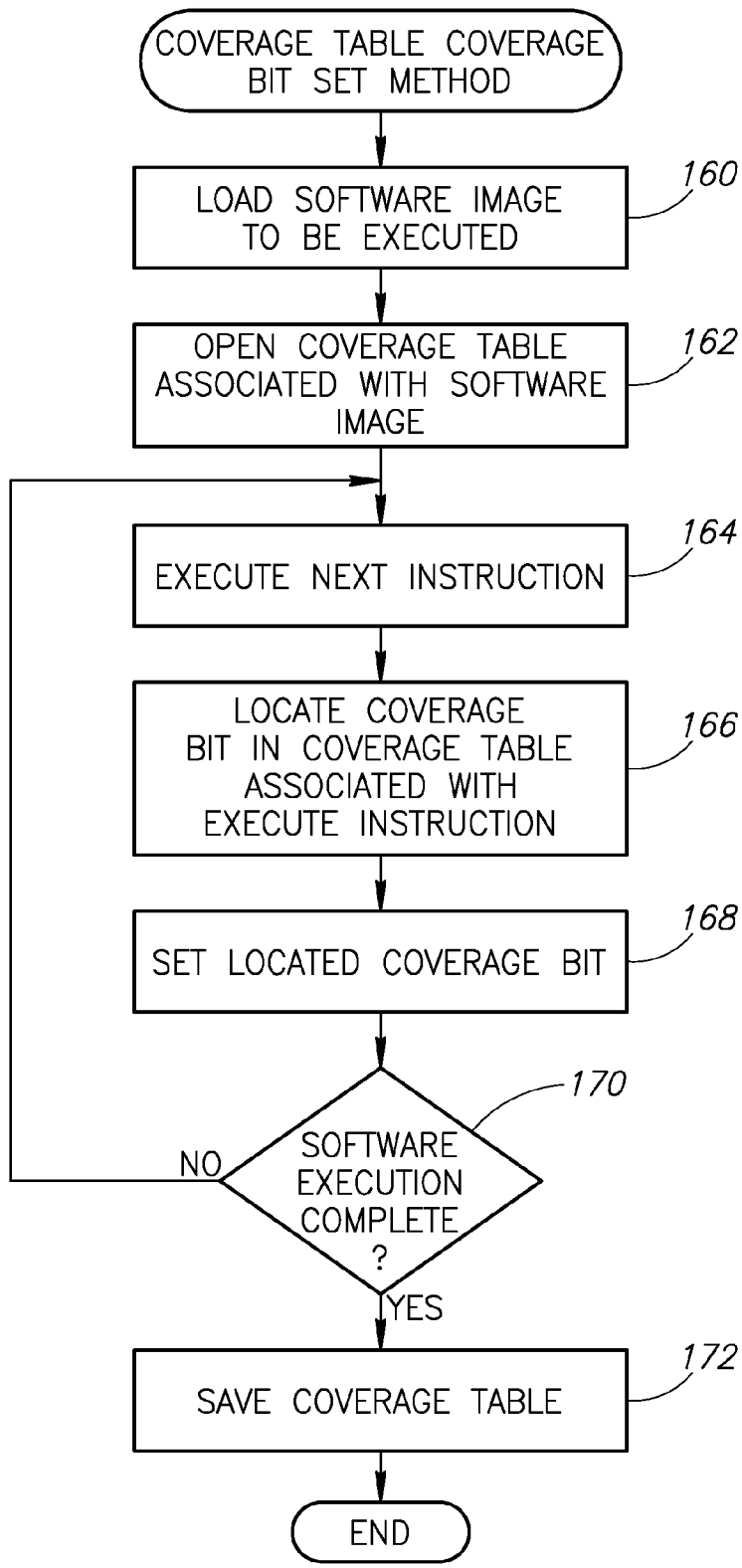
FIG. 12 is a glow diagram illustrating the code coverage table coverage bit set method of the present invention.

A flow diagram illustrating the coverage table bit set method of the present invention is shown in FIG. 12. First the software image to be executed is loaded (step 160) and the code coverage table associated with the loaded software image is opened (step 162). The next (or first, if the program just loaded) instruction is then executed (step 164). The code coverage bit associated with the executed instruction is located in the code coverage table (step 166) and the located code coverage bit is set (step 168). If there are additional instructions to execute (step 170) then the coverage table bit set method returns to step 164. Otherwise, if there are no more instructions to be executed (step 170) then the coverage table is saved to disk (step 172) and the coverage table section bit set method terminates.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. A method of implementing code coverage for a target software application executing on a computer system comprising a processor and loaded from a software image, said method comprising the steps of:

adding a bit dedicated for code coverage in each instruction in said target software application, wherein said code coverage bits are initially cleared by a compiler;

during execution of said software application, utilizing a hardware circuit to set the code coverage bit for every instruction executed, wherein setting said code coverage bit indicates its corresponding instruction has executed; and after execution of each instruction, writing the modified software application code with code coverage bit set back to the executing software image, wherein a processor instruction cache is writable and operative to store updated code coverage bits associated with each instruction executed.

2. The method according to claim 1, wherein said code coverage bit is implemented as a dedicated additional bit in the Instruction Set Architecture of said computer system.

3. The method according to claim 2, wherein said set code coverage bit is stored in a code coverage section of said software application executable file or companion file to said software application executable file.

4. The method according to claim 1, wherein said code coverage bit is implemented in a component of said software image.

5. The method according to claim 4, wherein said component comprises a plurality of code coverage bits where each code coverage bit represents a corresponding instruction in said software image.

6. The method according to claim 1, wherein said code coverage bit is implemented in a companion file associated with said software image.

7. The method according to claim 6, wherein said companion file a plurality of code coverage bits where each code coverage bit represents a corresponding instruction in said software image.

8. The method according to claim 1, wherein said code coverage bit is implemented in a code coverage table.

9. The method according to claim 8, wherein said code coverage table comprises a plurality of code coverage bits where each code coverage bit represents a corresponding instruction in said software image.

10. The method according to claim 8, wherein said code coverage table resides at a specific address in volatile memory of said computer system.

11. The method according to claim 8, wherein the address of said code coverage table is stored in a code table register within a central processing unit within said computer system.

12. A method of implementing code coverage via a code coverage table for a target software application executing on a computer system comprising a processor, said target software application including a plurality of software instructions loaded from a software image, said method comprising the steps of:

providing a dedicated hardware coverage table in processor memory, said dedicated hardware coverage table associated with said software image upon loading of said target software application, wherein said dedicated hardware coverage table comprises one bit for every instruction in said target software application, said code coverage bits in said dedicated hardware coverage table initially cleared;

providing a dedicated hardware coverage cache for caching a portion of said coverage table and containing recently accessed instruction addresses;

utilizing the address of an executing instruction, marking an entry in said dedicated hardware coverage table as covered by setting a corresponding coverage bit in said coverage cache, wherein setting said code coverage bit in said dedicated hardware coverage cache indicates its corresponding instruction has executed; and periodically writing the data in said dedicated hardware coverage cache to said dedicated hardware coverage table in memory.

13. The method according to claim 12, wherein said code coverage table comprises a plurality of code coverage bits where each code coverage bit represents a corresponding instruction in said software image.

14. The method according to claim 12, wherein said code coverage table resides at a specific address in volatile memory of said computer system.

15. The method according to claim 12, wherein the address of said code coverage table is stored in a code table register within a central processing unit within said computer system.

16. A computer system implementing a code coverage table for a target software application executing thereon, said target software application including a plurality of software instructions loaded from a software image, comprising:

a dedicated hardware coverage table in processor memory, said dedicated hardware coverage table associated with said software image upon loading of said target software application, wherein said dedicated hardware coverage table comprises one bit for every instruction in said target software application, said code coverage bits in said dedicated hardware coverage table initially cleared;

a dedicated hardware coverage cache for caching a portion of said dedicated hardware coverage table and containing recently accessed instruction addresses; and a hardware circuit operative to mark, utilizing the address of an executing instruction, an entry in said dedicated hardware coverage table as covered by setting a corresponding coverage bit in said coverage cache, wherein setting said code coverage bit in said dedicated hardware coverage cache indicates its corresponding instruction has executed, and operative to periodically write the data in said dedicated hardware coverage cache to said dedicated hardware coverage table in memory.

17. The computer system according to claim 16, wherein said code coverage table is created by an operating system when said software application is loaded.

18. The computer system according to 16, wherein said code coverage bit is set during the commit stage of executing an instruction by said central processing unit.

19. The computer system according to claim 16, wherein said code coverage table resides at a specific address in volatile memory of said computer system.

20. The computer system according to claim 16, wherein the address of said code coverage table is stored in a code table register within said central processing unit.

* * * * *